United States Patent [19]

Steinke

[11] 4,278,501
[45] Jul. 14, 1981

[54] SPRING ELEMENT FOR HOLDING DOWN NUCLEAR REACTOR FUEL ASSEMBLY

[75] Inventor: Alexander Steinke, Erlangen, Fed. Rep. of Germany

[73] Assignee: Kraftwerk Union Aktiengesellschaft, Mülheim an der Ruhr, Fed. Rep. of Germany

[21] Appl. No.: 944,707

[22] Filed: Sep. 22, 1978

[30] Foreign Application Priority Data

Sep. 23, 1977 [DE] Fed. Rep. of Germany ....... 2742946

[51] Int. Cl.³ .............................................. G21C 3/30
[52] U.S. Cl. ...................................... 176/78; 176/76; 176/81
[58] Field of Search ........................ 176/76, 78, 81, 50

[56] References Cited

U.S. PATENT DOCUMENTS

| | | | |
|---|---|---|---|
| 3,770,583 | 11/1973 | Klumb et al. ...................... | 176/78 X |
| 3,801,734 | 4/1974 | West ....................................... | 176/50 |
| 3,953,287 | 4/1976 | Long et al. ............................. | 176/78 |
| 3,954,560 | 5/1976 | Delafosse et al. ..................... | 176/78 |
| 3,971,575 | 7/1976 | Lesham et al. ....................... | 176/78 X |
| 4,038,137 | 7/1977 | Pugh ....................................... | 176/78 |
| 4,038,138 | 7/1977 | Linning et al. ...................... | 176/78 X |
| 4,045,287 | 8/1977 | van Santen ............................ | 176/78 |
| 4,064,004 | 12/1977 | Long et al. ............................. | 176/78 |
| 4,076,586 | 2/1978 | Bideau et al. .......................... | 176/78 |
| 4,078,967 | 3/1978 | Anthony ................................ | 176/78 |
| 4,104,120 | 8/1978 | Grubelich ......................... | 176/78 X |
| 4,155,808 | 5/1979 | Jabsen ..................................... | 176/78 |
| 4,157,277 | 6/1979 | Marmonier et al. ................. | 176/19 J |
| 4,164,443 | 8/1979 | Gibbons et al. ....................... | 176/50 |

Primary Examiner—Peter A. Nelson
Attorney, Agent, or Firm—Herbert L. Lerner

[57] ABSTRACT

Spring element for holding down and bracing a fuel assembly against a hold-down plate upwardly limiting the reactor core of a nuclear reactor, includes a spring-loaded rod-shaped member separately formed independently of the fuel assembly and being slidable axially and form-lockingly into the fuel assembly.

4 Claims, 4 Drawing Figures

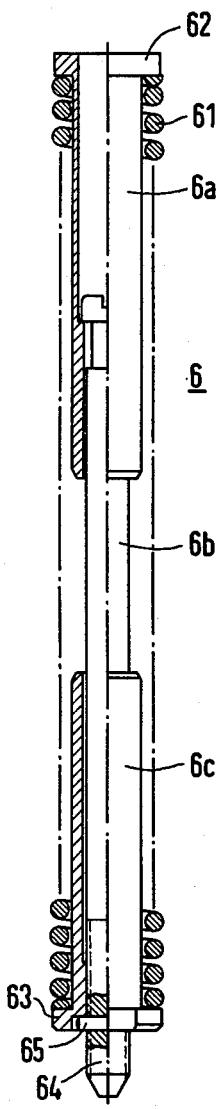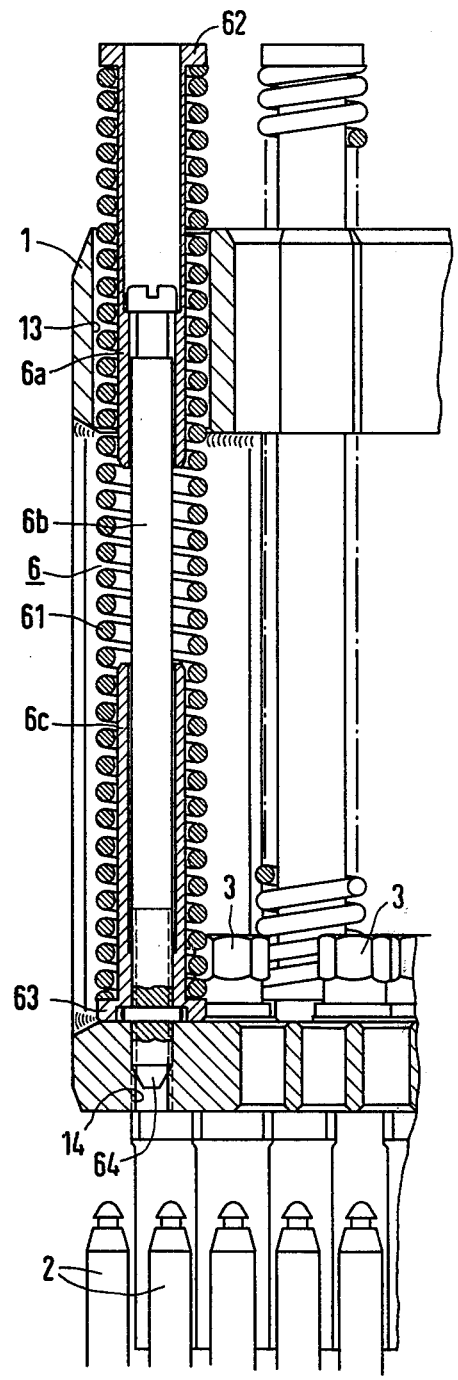
Fig.3
Fig.4

SPRING ELEMENT FOR HOLDING DOWN NUCLEAR REACTOR FUEL ASSEMBLY

The invention relates to a spring element for holding down and bracing or supporting fuel assemblies especially of water-cooled neclear reactors, against a hold-down plate upwardly limiting the reactor core. Bracing the individual fuel assemblies of a nuclear reactor against a hold-down plate in this manner has become generally known heretofore. This is necessary because, otherwise, the flow forces of the reactor coolant might lift the fuel assemblies upwardly out of the normal position thereof. A rigid mounting for the individual fuel assemblies by means of this hold-down plate cannot be provided because variations in length due to thermal expansion and, also, radiation-induced length increase must be afforded. On the other hand, since a loose seating of the fuel assemblies below the hold-down plate must be avoided at all costs, springs are normally disposed in such a manner that length increase and thermal expansion can nevertheless occur against the force of these springs during operation of the fuel assemblies without subjecting the mountings to excessive stresses. While such spring elements known in the state of the art generally fulfill, in practice, the purposes for which they are intended, when other structural materials are used in fuel assemblies, such as Zircaloy guide tubes, for example, a wider operating range which is difficult to attain i.e. spring travel, is necessary to assure that the fuel assemblies will be properly held or supported under all operating conditions. Due to the assembly geometry, which is presupposed in most cases, variations in the operating characteristic could heretofore be attained only to an insufficient extent by modified spring elements.

The problem therefore arose of developing a spring element construction, the assembly and disassembly of which from a fuel assembly can be accomplished more simply than heretofore and the spring travel i.e. the operating range, thereof is adjustable and can be kept considerably wider or greater than heretofore.

It is accordingly an object of the invention to provide a spring element for holding down nuclear reactor fuel elements which is more simply assemblable with and disassemblable from a fuel assembly than heretofore and has a greater spring travel or operating range than heretofore, due to the adjustability thereof.

With the foregoing and other objects in view, there is provided, in accordance with the invention, a spring element for holding down and bracing a fuel assembly against a hold-down plate upwardly limiting the reactor core of a nuclear reactor, comprising a spring-loaded rod-shaped member separately formed independently of the fuel assembly and being slidable axially and form-lockingly into the fuel assembly.

Should replacement or removal of the spring element, in the case of a previously irradiated spring element, be desired, this can be effected by means of a simple gripper device, after the reactor core has been made accessible, without requiring rotation of the fuel assembly. At any other place of deposit for fuel assemblies, this can be effected without any special preparations.

In accordance with another feature of the invention, the rod-shaped member is telescopically slidable together, and including a compression spring urging the telescopically slidable rod-shaped member, in neutral position thereof, into the greatest possible assumed length thereof, the rod-shaped member, in installed condition thereof, being mounted, at one end thereof, in at least one bore formed in a head of the fuel assembly and engaging the hold-down plate, at the other end thereof.

In accordance with a further feature of the invention, the compression spring is disposed around and extends along the length of the rod-shaped member.

In accordance with an added feature of the invention, the rod-shaped member is formed of three parts including a threaded bolt formed with a shaft and a head, an upper sleeve telescopically guidable on the shaft of the threaded bolt and engageable with the head of the threaded bolt, and an internally threaded lower sleeve wherein the threaded bolt is threadedly received for adjusting the combined length thereof, the lower sleeve and the threaded bolt being securable against relative rotation, the one end of the rod-shaped member being an end of the threaded bolt projecting beyond the lower sleeve and engageable in the fuel-element head.

In accordance with a concomitant feature of the invention, the compression spring surrounds the rod-shaped member, and both the upper and lower sleeves are formed with a respective collar at ends thereof forming opposite ends of the rod-shaped member, the collars serving as stops for the compression spring.

Other features which are considered as characteristic for the invention are set forth in the appended claims.

Although the invention is illustrated and described herein as embodied in spring element for holding down nuclear reactor fuel assembly, it is nevertheless not intended to be limited to the details shown, since various modifications and structural changes may be made therein without departing from the spirit of the invention and within the scope and range of equivalents of the claims.

The contructions and method of operation of the invention, however, together with additional objects and advantages thereof will be best understood from the following description of specific embodiments when read in connection with the accompanying drawings, in which:

FIG. 3 is an elevational view of a spring element according to the invention; and FIG. 4 is a view similar to that of FIG. 2 of the hold-down device according to the invention.

Figure 1:
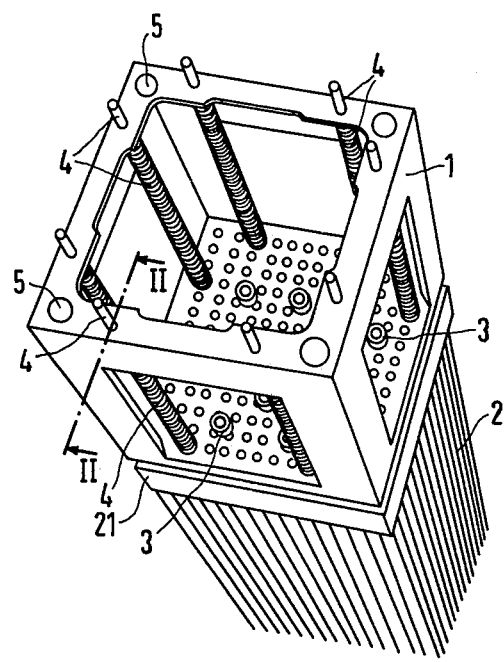
FIG. 1 is a perspective view of a conventional spring element hold-down device mounted on a fuel assembly.

Referring now to the drawing, there is shown in FIG. 1 a perspective view as seen from the top onto the head 1 of a fuel assembly formed of a multiplicity of fuel rods 2. The head member 1 of this fuel assembly is connected to a non-illustrated base member by guide tubes 3 and, together with spacers 21, forms the rigid frame or skeleton of such a fuel assembly. The fuel rods 2 per se are held at a mutual spacing within this frame by the spacers 21 but can expand freely in axial direction. To control this nuclear reactor, control rods formed at least in part of neutron-absorbing materials are immersed in the guide tubes 3. In the interst of clarity, these control rods are not shown in detail, however, especially since illustration thereof is unnecessary for an understanding of the invention.

Figure 2:
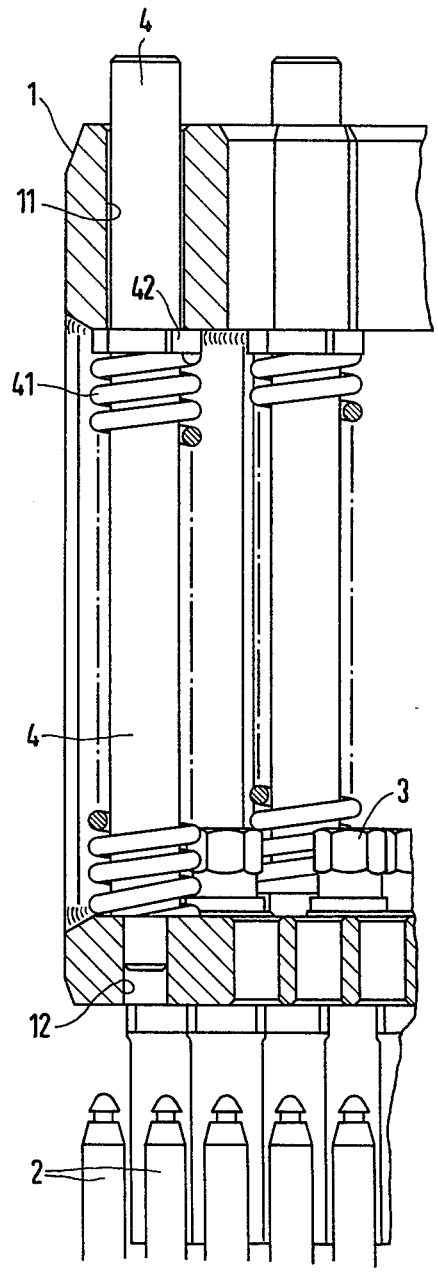
FIG. 2 is a much enlarged fragmentary elevational view of FIG. 1.

The head 1 of the fuel assembly if formed in the conventional embodiment of FIGS. 1 and 2, by a laterally cut-out frame and has, at an end face thereof, four bores 5 for receiving adjusting or dowel pins which are fastened to a non-illustrated hold-down plate. A spring element 4 protrudes from the frame on both sides of each bore 5 for resiliently bracing or supporting the frame at the non-illustrated hold-down plate. The subject of the invention of the instant application is a spring element for holding down fuel assemblies which is an improvement over the conventional spring element illustrated in FIG. 1 which is mounted in the fuel assembly head. The conventional spring element of FIG. 1 is shown in enlarged and greater detail in FIG. 2.

As is clearly shown in FIGS. 1 and 2, the conventional spring element 4 is formed of a pin which is slidably mounted in bores 11 and 12 provided in the fuel assembly head. A compression spring 41 is braced against the bottom of the fuel assembly head and forces the pin 4 upwardly in the illustrated manner. The upper end of this spring 41 rests, for this purpose, against stop 42 which is laterally inserted into a transverse slot formed in the pin 4.

In FIG. 3, there is shown an embodiment of a new spring element 6 according to the invention, partly in longitudinal cross section, and in FIG. 4, the spring element 6 is shown, likewise in longitudinal section, but further in inserted position thereof in a fuel assembly head in a manner similar to the view of the conventional device of FIG. 2. In this regard, it is noted that FIGS. 2 and 4 represent longitudinal sections through the fuel assembly head of FIG. 1 taken along the line II—II in direction of the arrows. It can be seen, especially from FIG. 3, that the spring element 6 according to the invention is a part separate from the fuel assembly, and is inserted as a whole into the fuel assembly head 1 from the top, as shown in FIG. 4. The fuel element 6 can therefore also be withdrawn again as a whole; an operation which presents no difficulties even if performed by remote control. Also readily evident in FIG. 4 is the gain in "resilient length" of the spring element 6 for the same overall length that it has with respect to the coventional spring element 4 of FIG. 2.

The spring element 6 is assembled telescopically of three parts, namely, an upper sleeve 6a, a screw bolt 6b and a lower sleeve 6c. The upper sleeve 6a is provided with a collar or shoulder 62, and the lower sleeve with a collar or shoulder 63 which serve as stops for the spring 61. The threaded bolt 6b is screwed into the lower sleeve 6c and thereby adjustable in length; the lower projecting end 64 of the threaded bolt 6b is provided for engagement in a bore 14 formed in the fuel assembly head 1. Movement of the projecting bolt end 64 in the fuel assembly head 1 is not possible, and interference thereof with fuel rods may possibly be located therebelow which is therefore precluded. The upper sleeve 6a is formed with an internal shoulder 66 by which it is braced against the head 67 of the threaded bolt 6b and can be forced downwardly on the latter telescopically against the force of the spring 61. To prevent rotation of the lower sleeve 6c on the threaded bolt 6b, which would result in a change in length of the entire spring element 6 and also to a change in the initial stress or pre-tensioning force thereof, a conventional screw securing device such as a pin 65 or a spot weld or any other rotation-preventing device known in the prior art is provided.

This new spring element 6 according to the invention has not only the advantages of simplicity of construction, manufacture without problems, individual adjustibility with respect to length and initial spring stress, as well as ease of installation in the fuel-assembly head, but also the great advantage that it can be used instead of heretofore-known spring elements according to the state of the art, such as the elements 4 of FIGS. 1 and 2. For this purpose, it is necessary merely to enlarge the bore 11 (note FIG. 2) so that a bore 13 (FIG. 4) having a somewhat larger bore diameter is formed. This is an operation which can be performed without any problem on all fuel assembly heads employed heretofore, so that the new spring elements 6 according to the invention also can be exchanged for the heretofore employed ones, such as the spring elements 4 of FIG. 2, especially if there is a change in the operating condition.

It is also possible, of course, to use these spring elements 6 according to the invention in fuel assembly heads of different construction than that shown in FIG. 4, since such heads need only to be provided with the bores 14 and 13 for receiving this spring element 6. In the illustrated embodiment of the instant application, eight such spring elements 6 have been provided for each fuel assembly head 1, but this number is in no way characteristic or limiting, since the required spring force for each fuel assembly is able to be adjusted or set by suitably selecting the strength of the individual springs 61 as well as the number of spring elements 6 themselves.

In conclusion, yet another advantage of this new construction should be noted, namely that even in the event of a break in the spring 61, no loose parts can result, which would otherwise require retrieval at all costs at great expense for specialized apparatus for this purpose and in time consumption.

I claim:

1. Spring element for holding down and bracing a fuel assembly against a hold-down plate upwardly limiting the reactor core of a nuclear reactor, comprising a spring-loaded rod-shaped member formed independently of the fuel assembly and being slidable axially into the fuel assembly, said rod-shaped member having a plurality of parts telescopically slidable together, and including a compression spring engaging two of said parts and, in neutral position of the rod-shaped member, urging said parts away from one another and forming said rod-shaped member into the greatest possible assumed length thereof, said rod-shaped member, in installed condition thereof, being mounted, at one end thereof, in at least one bore formed in a head of the fuel assembly and engaging the hold-down plate, at the other end thereof.

2. Spring element according to claim 1 wherein said compression spring is disposed around and extends along the length of the rod-shaped member.

3. Spring element for holding down and bracing a fuel assembly against a hold-down plate upwardly limiting the reactor core of a nuclear reactor, comprising a spring-loaded rod-shaped member formed independently of the fuel assembly and being slidable axially into the fuel assembly, said rod-shaped member being a plurality of parts telescopically slidable together, and including a compression spring urging said rod-shaped member, in neutral position thereof, into the greatest possible assumed length thereof, said rod-shaped member, in installed condition thereof, being mounted, at one end thereof, in at least one bore formed in a head of the fuel assembly and engaging the hold-down plate, at the other end thereof, the rod-shaped member being formed of three parts including a threaded bolt formed with a shaft and a head, an upper sleeve telescopically guidable on the shaft of said threaded bolt and engageable with said head of said threaded bolt, and an internally threaded lower sleeve wherein said threaded bolt is threadedly received for adjusting the combined length thereof, said lower sleeve and said threaded bolt being securable against relative rotation, said one end of the rod-shaped member being an end of said threaded bolt projecting beyond said lower sleeve and engageable in the fuel-element head.

4. Spring element according to claim 3 wherein said compression spring surrounds said rod-shaped member and both said upper and lower sleeves are formed with a respective collar at ends thereof forming opposite ends of said rod-shaped member, said collars serving as stops for said compression spring.

* * * * *